US008566838B2

(12) United States Patent
Sabin et al.

(10) Patent No.: US 8,566,838 B2
(45) Date of Patent: Oct. 22, 2013

(54) TECHNIQUES FOR WORKLOAD COORDINATION

(75) Inventors: Jason Allen Sabin, Lehi, UT (US); Jeremy Ray Brown, Orem, UT (US); Lloyd Leon Burch, Payson, UT (US); Michael John Jorgensen, Mapleton, UT (US); Michael Fairbanks, Lindon, UT (US); Nathaniel Brent Kranendonk, Springville, UT (US); Kal A. Larsen, Springville, UT (US); Thomas Larry Biggs, Payson, UT (US)

(73) Assignee: Novell, Inc., Provo, UT (US)

( * ) Notice: Subject to any disclaimer, the term of this patent is extended or adjusted under 35 U.S.C. 154(b) by 249 days.

(21) Appl. No.: 13/046,535

(22) Filed: Mar. 11, 2011

(65) Prior Publication Data
US 2012/0233625 A1    Sep. 13, 2012

(51) Int. Cl.
*G06F 9/00*    (2006.01)

(52) U.S. Cl.
USPC ......................... 718/105; 709/222

(58) Field of Classification Search
USPC ..................... 718/1, 105; 709/222
See application file for complete search history.

(56) References Cited

U.S. PATENT DOCUMENTS

| 7,350,186 | B2 | 3/2008 | Coleman et al. | |
| 2007/0180450 | A1* | 8/2007 | Croft et al. | 718/1 |
| 2007/0271560 | A1 | 11/2007 | Wahlert et al. | |
| 2009/0037162 | A1 | 2/2009 | Gaither et al. | |
| 2010/0094948 | A1 | 4/2010 | Ganesh et al. | |
| 2010/0287548 | A1* | 11/2010 | Zhou et al. | 718/1 |
| 2011/0023028 | A1* | 1/2011 | Nandagopal et al. | 718/1 |
| 2011/0039573 | A1* | 2/2011 | Hardie | 455/456.1 |
| 2011/0161851 | A1* | 6/2011 | Barber et al. | 715/769 |
| 2011/0321041 | A1* | 12/2011 | Bhat et al. | 718/1 |
| 2011/0321045 | A1* | 12/2011 | Takemura | 718/1 |
| 2012/0131594 | A1* | 5/2012 | Morgan | 718/105 |
| 2012/0180042 | A1* | 7/2012 | Tsirkin et al. | 718/1 |

* cited by examiner

*Primary Examiner* — Camquy Truong
*Assistant Examiner* — Charlie Sun
(74) *Attorney, Agent, or Firm* — Schwegman, Lundberg & Woessner, P.A.

(57) ABSTRACT

Techniques for workload coordination are provided. An automated discovery service identifies resources with hardware and software specific dependencies for a workload. The dependencies are made generic and the workload and its configuration with the generic dependencies are packaged. At a target location, the packaged workload is presented and the generic dependencies automatically resolved with new hardware and software dependencies of the target location. The workload is then automatically populated in the target location.

19 Claims, 5 Drawing Sheets

TECHNIQUES FOR WORKLOAD COORDINATION

BACKGROUND

Cloud computing is rapidly changing the Internet into a collection of clouds, which provide a variety of computing resources, storage resources, and, in the future, a variety of resources that are currently unimagined. This new level of virtualization should have unbounded the physical and geographical limitations of traditional computing, but this is not yet the case.

Even with existing virtualization capabilities, businesses are faced with scaling, migration, and expense issues for their resources that operate in these cloud environments. That is, to achieve proper managed and controlled access to physical resources of these cloud environments, businesses have to manually manage and often manually schedule/plan for migrating from one cloud environment to other cloud environments.

Often an enterprise may want to only temporarily clone a cloud environment or part of a cloud on demand based on location and/or expense. For example a sales person may have setup an extensive demo involving multiple machines (part of a cloud or an entire cloud). He/she would like to convert this demo into an automated package to take with him/her on the road for demoing at customer sites without having to bring all the hardware and without determining exactly which machines were used. When the sales person gets on site he/she would like to clone and replicate the demo to the nearest cloud having the best resources available at the sales person's current location.

The sales person in the present example is likely out of luck because cloud migration from one set of hardware devices to another new set of hardware devices is presently not an entirely automated process. This is so because the resources of a cloud that are to be cloned often have hard coded machine-specific limitations (in fact this is more common than uncommon), such that simply packaging the configuration up and migrating to a new environment would likely result in numerous failures in the new environment because the hardware specific limitations are unknown and nonexistent in the new environment. So, although the migration may seem to work as soon as some of the resources are accessed failures will occur. Worse yet a hard failure or exception may not occur and a resource may appear to process but be using wrong data such that the new installation becomes very unreliable.

Enterprises are aware of this scenario and as a result, they spend a lot of time manually configuring new installations and testing new installations, which hardly saves these enterprises much time and money and clearly makes the process a largely manual process. In our sales person example, the sales person would have to arrive at the site of the demo many days before the scheduled demo and work with technology staff to ensure everything is properly configured and running as expected.

Therefore, there is a need for a more automated approach to workload coordination for migration and cloning.

SUMMARY

Various embodiments of the invention provide techniques for workload coordination. Specifically, a method for workload packaging is presented.

More particularly, a machine identifier for a machine is received and resources used by the machine are automatically and dynamically discovered. Next, a workload is selected as one of the discovered resources of the machine and workload resources associated with the workload are resolved. Then, dependent references are identified, which are specific hardware and software settings embedded in each of the workload resources and which are specific to a processing environment of the machine. Dependent references and made into generic references and the workload, with configuration information that includes the generic references, is packaged into a portable workload package.

DETAILED DESCRIPTION

Figure 1:
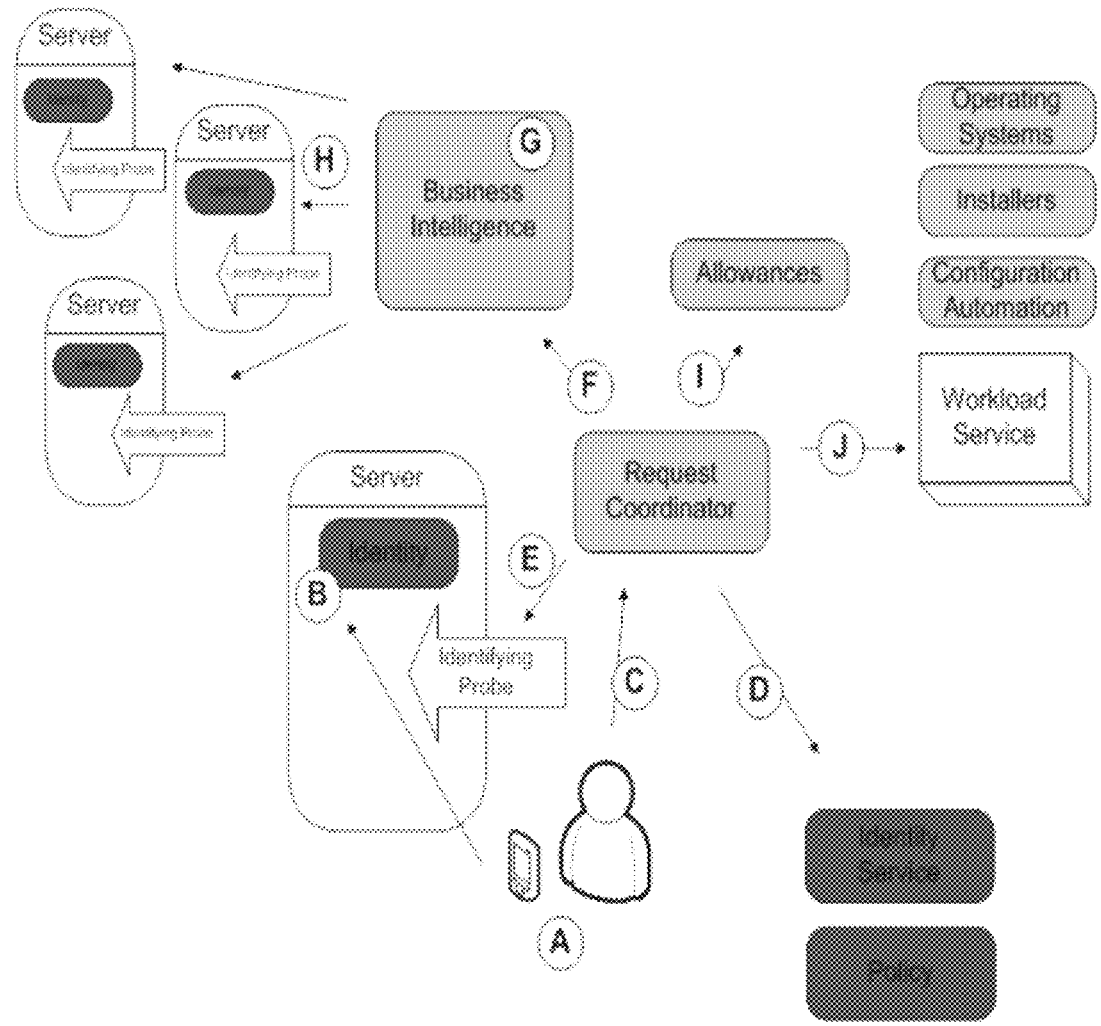
FIG. 1 is a diagram of an example architecture for workload packaging, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

It is also noted that a single resource can include other resources. For example, a machine resource can include a variety of hardware and software resources.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a cloud, a portion of a cloud, a set of coordinating services, a hardware device, an agent, an application, or various combinations of these things.

The "workload" is a special type of resource that includes a variety of other resources. For example, a workload for identity management may include a variety of secure database, a variety of authentication services, and a variety of network machines.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-5.

Embodiments and components of the invention are implemented and reside in a non-transitory computer-readable medium that executes on one or more processors that are specifically configured to process the embodiments and components described herein and below.

FIG. 1 is a diagram of an example architecture for workload packaging, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured and programmed (via the non-transitory computer-readable medium) to execute the components.

The FIG. 1 is presented with reference to an example enterprise situation that an enterprise utilizing cloud environments can encounter. Again, this example is presented for purposes of illustration only as other situations can occur as well and still benefit from the techniques presented herein and below.

Initially there is a service that helps identify exactly what is included in the workload service (can also be referred to herein as "workload"). A workload service may be a set of servers, running specific software, with specific configurations. Business Intelligence (data gathered about the operations of the business and available in data stores, such as a database) helps identify exactly what machines are connected in the workload service and the relationships of the software to the hardware within the workload service.

When a request is given to discover the entire workload service it identifies the needed aspects, via the business intelligence then determines if the request can be performed. It then packages up the workload service (including Operating Systems (OS's), installers, and automated configuration packages, etc.). Once the service (packaging service) has been executed, the resulting package is ready to be deployed to another desired location. This can result in a replication or clone of the workload service, recovery for the workload service, backup for the workload service, or any other possible scenario that needs to move this service to a new processing environment or cloud.

In the example that follows a Sales Engineer is discussed, who has a need to setup a complex demo of multiple machines and software packages (combined forming a workload service). It is again noted that this is but one possible implementation scenario and the technique can actually be expanded to any Information Service and Technology (IS & T) infrastructure, test and/or development demo's, and/or any other imaginable or desired workload service.

To start with the user A (sales person in the present example) wants to be able to replicate and clone an entire workload service, but needs to group and capture the machines and components within the demo. He/she locates an individual machine that they want to clone the service from. This is server B. He/she can use a mobile device to take a picture of the bar code on server B or can input an Internet Protocol (IP) address of the server. This information is then sent to the Request Coordinator over Secure Sockets Layer (SSL) via WiFi or 3G via C.

The Request Coordinator then determines that this request needs authentication. So, the Request Coordinator requests authentication to User A via the same connection. The Request Coordinator gathers the authentication credentials and presents them to the Identity Service via item D. The credentials are validated against the Identity Service, which determines Policy requirements, and which can be used to determine if he/she (sales person) has authorization to scan this machine and determine what other machines/services are attached and connected to this service (workload service being packaged).

The request coordinator uses a listing of services that the server B is connected with. This can be accomplished either via a static listing that has been built previously or an identifying probe can be sent at Item E to the server. This probe has access to gather the services that are running on this server or complex services, which this server is a part of. This can be a component of the business intelligence for the enterprise using the technique of the FIG. 1. This listing is run through policy at D to determine what entries can be displayed to this user.

The user A (sales person) then selects the service he/she wants to clone and replicate at some future point in time. The request coordinator then contacts the business intelligence service at item F. An example of business intelligence software is Novell Business Service Manager, distributed by Novell Inc. of Waltham, Mass. It is noted that Business intelligence can include data and information as well as services as discussed above. $3^{rd}$ party software can contact this business intelligence services via web services or some other Application Programming Interface (API) or Software Development Kit (SDK).

The business intelligence software (item G) can then collect and determine which of the other servers are connected to the service as requested by user A on server B. This is performed at item H. All the other possible servers that are connected to the desired service are then identified and returned to the Request Coordinator via the Business Intelligence software. Once all the servers and various components are identified from the request coordinator, security and authentication is performed to make sure proper access exists to package the workload service. These Allowances are determined at Item I.

Now that all the components of the complex workload service are known, identity and policy based checks are made (security). Some components may be allowed to be replicated while others might not be allowed. Once the security and policy checks are made the label the workload service as a portable package. The portable package holds all the components that are going to be cloned in a new location at some later point in time to establish the workload service at that new location. This is listed at Item J where all information about operating systems, installers, and configuration automation has been collected.

Figure 2:
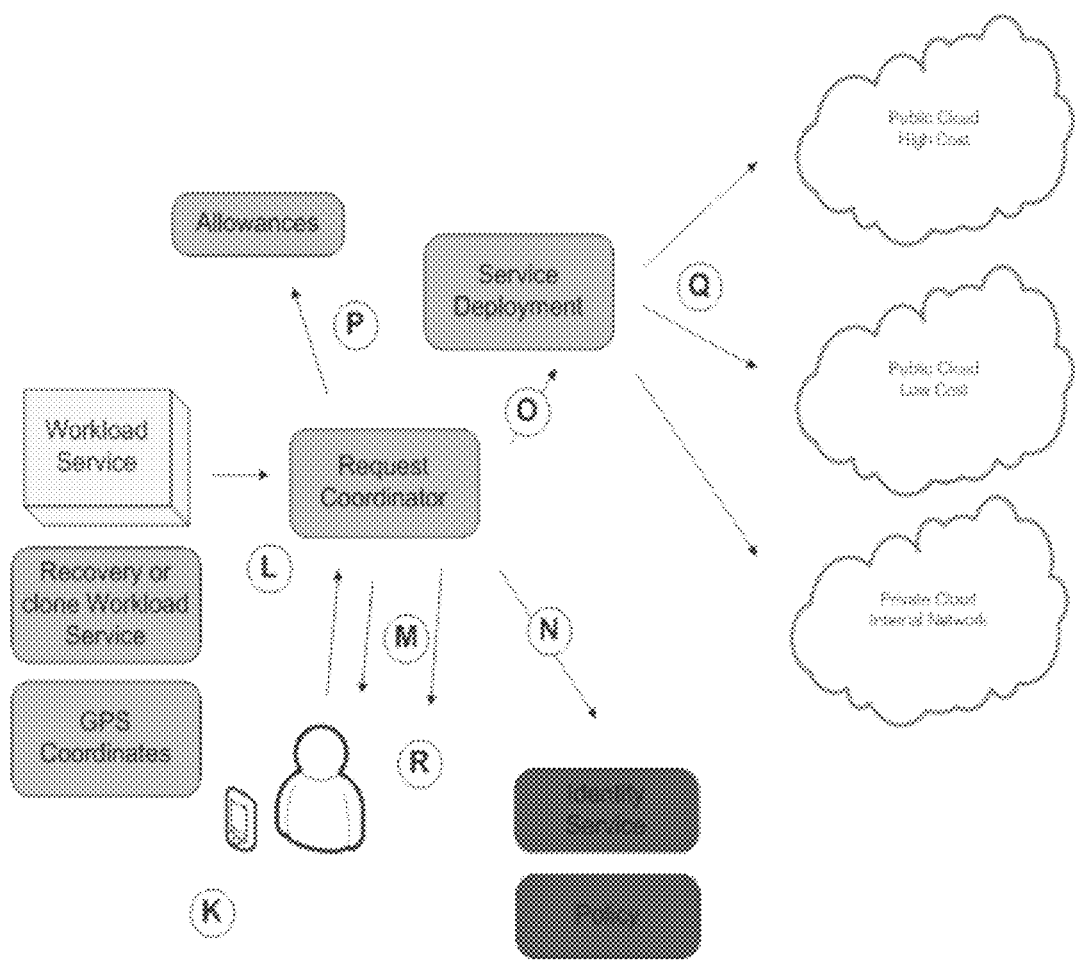
FIG. 2 is a diagram of an example architecture for workload population from a workload packaged by the FIG. 1, according to an example embodiment.

FIG. 2 is a diagram of an example architecture for workload population from a workload packaged by the FIG. 1, according to an example embodiment. Again, this is but one configuration to populate a packaged workload service and the components and examples are presented for purposes of illustrations as other scenarios can exist without departing from the techniques presented herein above and below.

The components of the FIG. 2 are implemented in non-transitory and processor-readable storage medium and are executed on physical processors on one or more networks. Each processor specifically configured to execute the components.

The FIG. 2 is presented with reference to a specific example situation that was discussed above with the FIG. 1. Again, this is being presented for purposes of illustration only as other situations can occur as well and still benefit from the techniques presented herein and below.

Once the workload service has been automatically discovered and defined in the package as described in the FIG. 1, the User needs to re-service and clone at a later time in any location. Suppose the user has moved locations across the country or across the world. The user then uses some type of mobile device, computer, phone, tablet, or any other device (Item K) to connect to the Request Coordinator (Item L) to instantiate the re-service, clone, or recovery of a workload service. The Request Coordinator (L) first needs to validate the identity of the User with a request back (Item M) to the network device at Item K. The user needs to provide a possible set of credentials and Global Positioning Satellite (GPS) coordinates. The GPS coordinates can be automatically supplied by the device K. These credentials and coordinates are passed to an Identity Service (Item N), which validates the identity and then performs any type of policy decision to determine if the user has access to this workload service and other possible policy decisions. Once the user has been validated and policy decision checks are performed, the Service Deployment (Item O) is contacted. The Service Deployment (O) determines what type of clouds is available at this location with all the required costs and capabilities of each cloud. This includes private clouds, public clouds, and includes the costing/expense metrics associated with the usage of each of the clouds. Once all the options are discovered by the Service Deployment (Item O), the Request Coordinator contacts the Allowances engine (Item P) to determine what is allowed for this User. This includes the decisions from the Policy engine to determine how much allowances, how long of usage, how many machines, and any other costing, billing, and re-service attributes to determine if the service can be deployed into the cloud.

Once all of this has been determined then the Workload Service is deployed into the cloud (Item Q). This involves deploying the base OS's, auto-installers, and automated configuration to replicate, clone, or recover the defined workload service. The Service Deployment engine monitors and deploys each of these until all actions of the workload service have been performed. Once the workload service is deployed the User is notified (Item R) via the initially contacted device medium K. This notification includes all the specifics of the newly created workload service. The User is then free to use the workload service as he/she needs to.

The techniques presented herein above and below allow for some novel features and capabilities, such as but not limited to:

the ability to request to insert an identifying probe, which will calculate the physical requirements, software components, and configuration of a given server via Identity;

interacting with business intelligence to identify any dependent services that are needed for the individual machine to replicate and clone the existing desired service; and packaging up all the machines and configuration via a workload service and using location GPS technologies for dynamically regenerating and cloning up the service in various clouds.

Moreover in some embodiments, machine identification can be any of a barcode, an IP address, Media Access Control (MAC) address or any number of unique identity components.

Figure 3:
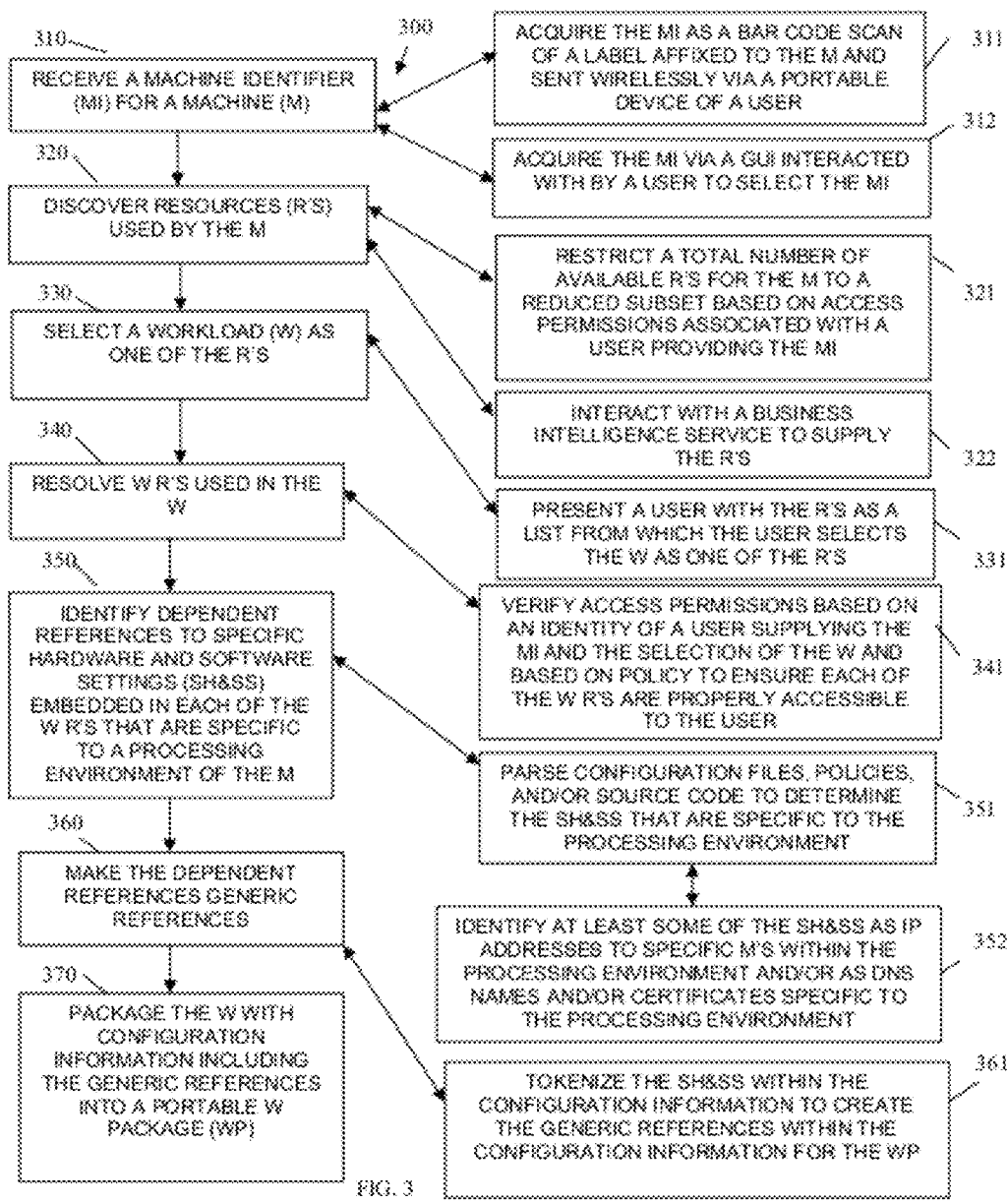
FIG. 3 is a diagram of a method for packaging a workload, according to an example embodiment.

FIG. 3 is a diagram of a method 300 for packaging a workload, according to an example embodiment. The method 300 (hereinafter "workload packager") is implemented and resides within a non-transitory computer-readable or processor-readable medium that executes on one or more processors of a network. Moreover, the workload packager is operational over a network and the network may be wired, wireless, or a combination of wired and wireless.

Example aspects of the workload packager were presented above with discussion of the FIG. 1.

At 310, the workload packager receives a machine identifier for a machine. This can be done in a variety of manners, some of which were discussed above with reference to the FIG. 1. Basically, a user selects a machine having a workload of interest to the user. By of interest it is meant that the user picks a specific workload for packaging and subsequent deployment in a target cloud at a later time and place.

For example, at 311, the workload packager acquires the machine identifier as a bar code scan from a label affixed to the machine and sent wirelessly via a portable device of a user. It may also be the case that a display of the machine presents its bar code that is scanned by the portable device of the user (such as a phone) and then wirelessly sent to the workload packager.

In another case, at 312, the workload packager acquires the machine identifier via a Graphical User Interface (GUI) that the user interacts with to select the machine via a machine label or identifier presented in the GUI. This may also be a physical or logical map of the network associated with the workload packager and the user can select graphical icons for the specific machine desired. The graphical icons then translated into the specific machine identifiers.

Other cases can be used as well to communicate the machine identifier for the machine of interest to the workload packager, such as a text message, and email, and other things as well.

At 320, the workload packager discovers resources used by the machine or in communication with the machine. This too can be achieved in a number of ways, such as via inspection of configuration file for the machine, inspecting the system file of running processes, inspecting log and event files, and the like.

In a particular situation, at 321, the workload packager can restrict a total number of available resources for the machine to a reduced subset of resources based on access permissions associated with the user providing the machine identifier.

According to an embodiment, at 322, the workload packager interacts with a Business Intelligence Service to supply the resources of the machine. This scenario was discussed above with reference to the FIG. 1.

At 330, the workload packager selects a workload as one of the resources. Again, it is noted that the workload itself can include a variety of resources, some of which in some instances may themselves be workloads. Moreover, in some cases, the workload is a VM.

In an embodiment, at 331, the workload packager presents a user with the resources as a list from which the user selects the workload as one of the resources. Here, this list may be presented on a display of a computer or a portable device of the user, such as a phone, tablet, etc.

At 340, the workload packager resolves workload resources used with the workload. That is, once the workload is selected then all the sub resources used within or needed by that workload are identified, these dependent resources are referred to herein as "workload resources."

In one situation, at 341, the workload packager verifies access permissions based on an identity of a user supplying the machine identifier and the selection of the workload and also based on policy. This is done to ensure each of the workload resources is properly accessible to the user that is making a request to package the workload.

At 350, the workload packager identifies dependent references to specific hardware and software settings embedded or associated with configuration information for each of the workload resources. These specific hardware and software settings are specific to the processing environment of the machine. Some examples include hardcoded Internet Protocol (IP) address, hardcoded Domain Name System (DNS) names and/or certificates, specific machine ports, and the like.

In one case, at 351, the workload packager identifies the specific hardware and software settings by parsing configuration files, policies, and/or source code to determine the specific hardware and software settings, which are specific to the processing environment of the machine.

These specific hardware and software settings of the workload resources make the workload less portable and in fact problematic when an attempt is made for migrating the workload.

Continuing with the embodiment of 351 and at 352, the workload packager identifies at least some of the specific hardware and software settings as the aforementioned hardcoded IP addresses that are specific to devices or machines within the machine's processing environment and DNS names and/or certificates that are specific to the machine's processing environment.

At 360, the workload packager makes the dependent references generic references. This can be done in a variety of manners. For example, a mapping file can identify specifically what locations within the workload resources that needed changed.

In another manner, at 361, the workload packager tokenizes the specific hardware and software settings within the configuration information for the workload package being created (discussed below at 370). This creates the generic references as tokens within the configuration information. A same token used in multiple places indicates that a specific setting is to be changed in multiple locations.

At 370, the workload packager packages the workload with configuration information that includes the generic references and other configuration settings for the workload resources that are not hardware and software specific. The configuration information and the source for the workload resources (and/or executables) represent a newly created workload package.

How the workload is subsequently populated as a new instance of the workload in a new cloud environment was discussed above with reference to the FIG. 2 and is discussed immediately below with reference to the FIG. 4.

Figure 4:
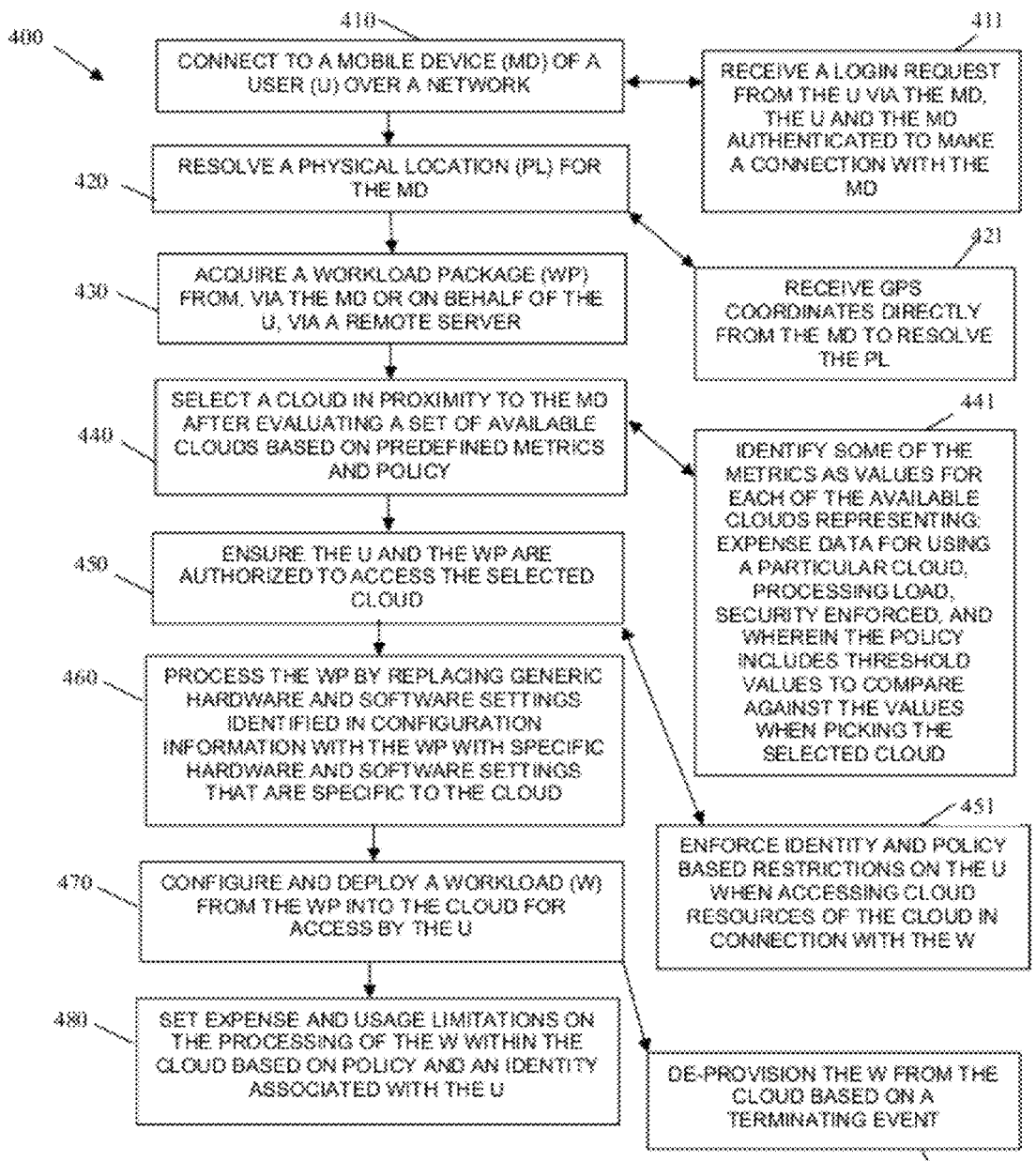
FIG. 4 is a diagram of a method for deploying a workload, according to an example embodiment.

FIG. 4 is a diagram of a method 400 for deploying a workload, according to an example embodiment. The method 400 (hereinafter "workload deployment manager") is implemented and resides within a non-transitory computer-readable or processor-readable medium that executes on one or more processors of a network. Moreover, the workload deployment manager is operational over a network and the network may be wired, wireless, or a combination of wired and wireless.

Example aspects of the workload deployment manager were presented above with reference to the discussion of the FIG. 2.

At 410, the workload deployment manager connects to a mobile device of a user over a network, such as a wireless WiFi network, a cellular network, a satellite network and the like. The mobile device can be a phone, a tablet, a laptop, and the like.

According to an embodiment, at 411, the workload deployment manager receives a login request from the user via the mobile device. The user and the mobile device are then authenticated to make a connection with the mobile device.

In some embodiments, the connection can be made via an application (APP) on a phone that the user activates when in the vicinity of the workload deployment manager. The APP locates the workload deployment manager and automatically initiates a login request.

At 420, the workload deployment manager resolves a physical location for the mobile device. This can be done manually by the user enter information to identify the physical location with assistance from the APP discussed above.

Alternatively, at 421, the workload deployment manager receives GPS coordinates for the mobile device directly from the device, such as through the APP discussed above or via interaction between the workload deployment manager and the mobile device.

At 430, the workload deployment manager acquires a workload package from or on behalf of the user. For instance, the user can supply the workload package or its networked location via the mobile device, such as through the APP (discussed above). In another case, the workload deployment manager can be configured to automatically acquire the workload package on behalf of the user via a profile setting associated with the user or via a registration of the workload package previously registered by the user. In the latter situation, the workload deployment manager can acquire the workload package via a remote server over a network connection. In yet another case, the user may upload the workload package directly to the workload deployment manager from the mobile device while connected to the workload deployment manager.

At 440, the workload deployment manager select a cloud in proximity to the mobile device after evaluating a set of available clouds based on predefined metrics and policy. Proximity can be resolved based on a threshold distance defined in the policy that states if the mobile device is within X feet or miles of the cloud it can be viewed as one of the clouds available for evaluation. It may also be that the user via the mobile device supplies the threshold distance for use in resolving what the proximity is to be set to.

According to an embodiment, at 441, the workload deployment manager identifies some of the metrics as values for each of the available clouds as representing: expense data for using a particular cloud, processing load for a particular cloud, and security enforced by a particular cloud or even the security designation of a particular cloud, such as public or private. The policy then includes conditions and threshold values that are compared against the metric values and the conditions drive selection of a particular cloud.

At 450, the workload deployment manager ensures the user and the workload package are authorized to access the selected cloud.

So, in an embodiment, at 451, the workload deployment manager enforces identity and policy based restrictions on the user when accessing cloud resources in connection with the workload that is to be deployed in the selected cloud.

At 460, the workload deployment manager processes the workload package by replacing generic hardware and software settings identified in configuration information with the workload package with specific hardware and software settings that are specific to the cloud.

At 470, the workload deployment manager configures and deploys a workload from the workload package into the selected cloud for access by the user.

In one scenario, at 480, the workload deployment manager sets expense and usage limitations on the processing of the workload within the cloud based on policy and an identity associated with the user.

It is noted that identity of the mobile device can also be used to augment security checks that use the identity of the user.

According to an embodiment, at 490, the workload deployment manager de-provisions the workload from the cloud based on a terminating event. A terminating event can be anything that policy indicates the workload should be removed from the cloud. Some example terminating events, but not limiting, include: illegal access of a resource as defined by the usage restrictions, a preset time limit expires, a license for use expires, and the like.

Figure 5:
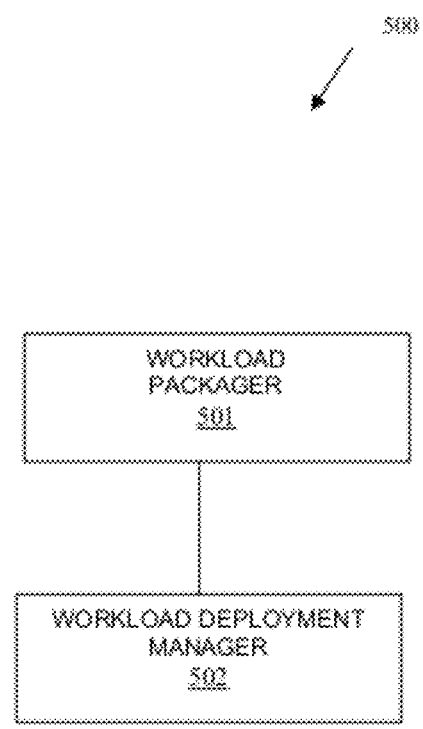
FIG. 5 is a diagram of a workload coordination system, according to an example embodiment.

FIG. 5 is a diagram of a workload coordination system 500, according to an example embodiment. The components of the workload coordination system 500 are implemented within and reside within a non-transitory and computer or processor-readable storage medium for purposes of executing on one or more processors of a network. The network may be wired, wireless, or a combination of wired and wireless.

The workload coordination system 500 implements, inter alia, various aspects of the FIGS. 1-4.

The workload coordination system 500 includes a workload packager 501 and a workload deployment manager 502. Each of these components and their interactions with one another will now be discussed in detail.

The workload packager 501 is implemented and programmed within a non-transitory computer-readable storage medium and executes on one or more processors of a first cloud processing environment (first cloud). Example processing associated with the workload packager 501 was presented above with reference to the FIGS. 1 and 3.

The workload packager 501 is configured to acquire a workload identifier for a workload having a plurality of workload resources to package the workload as a workload package. The workload packager 501 further configured to remove and make generic specific hardware and software settings that are referenced in the workload resources and that are specific to the first cloud.

The workload deployment manager 502 is implemented and programmed within a non-transitory computer-readable storage medium and executes on one or more processors of a second cloud. Example processing associated with the workload deployment manager 502 is presented above with reference to the FIGS. 2 and 4.

The workload deployment manager 502 is configured to select a target cloud when requested to do so for deploying the workload package as a new instance of or clone of the workload. This is at least partially achieved by changing the generic specific hardware and software settings to new hardware and software settings that are now specific to the target resource of the target cloud.

According to an embodiment, the workload packager 501 and the workload deployment manager 502 are each configured to enforce identity and policy based authentication when creating the workload package and when deploying the new instance of the workload from the workload package in the target cloud.

In another scenario, the workload deployment manager 502 is configured to de-provision the new instance of the workload from the target cloud based on detection of a terminating event.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
receiving a machine identifier for a machine;
discovering resources used by the machine;
selecting a workload from the discovered resources used by the machine, the workload is a special type of resource present in the discovered resources that includes a variety of other resources;
resolving workload resources used in the workload that is selected;
identifying dependent references to specific hardware and software settings embedded with workload configuration information in each of the workload resources that are specific to a processing environment of the machine, the dependent references include hardcoded Internet Protocol (IP) addresses, hardcoded Domain Name System (DNS) names, certificates, and specific machine ports;
making the dependent references generic references; and
packaging the workload with configuration information including the generic references into a portable workload package.

2. The method of claim 1, wherein receiving further includes acquiring the machine identifier as a bar code scan of a label affixed to the machine and sent wirelessly via a portable device of a user.

3. The method of claim 1, wherein receiving further includes acquiring the machine identifier via a Graphical User Interface (GUI) interacted with by a user to select the machine identifier.

4. The method of claim 1, wherein discovering further includes restricting a total number of available resources for the machine to a reduced subset based on access permissions associated with a user providing the machine identifier.

5. The method of claim 1, wherein discovering further includes interacting with a business intelligence service to supply the resources.

6. The method of claim 1, wherein selecting further includes presenting a user with the resources as a list from which the user selects the workload as one of the resources.

7. The method of claim 1, wherein resolving further includes, verifying access permissions based on an identity of a user supplying the machine identifier and the selection of the workload and based on policy to ensure each of the workload resources are properly accessible to the user.

8. The method of claim 1, wherein identifying further includes parsing configuration files, policies, and/or source code to determine the specific hardware and software settings that are specific to the processing environment.

9. The method of claim 1, wherein making further includes tokenizing the specific hardware and software settings within the configuration information to create the generic references within the configuration information for the workload package.

10. A method implemented in a non-transitory machine-readable storage medium and processed by one or more processors configured to perform the method, comprising:
   connecting to a mobile device of a user over a network;
   resolving a physical location for the mobile device;
   acquiring a workload package from, via the mobile device or on behalf of the user, via a remote server;
   selecting a cloud processing environment (cloud) in proximity to the physical location after evaluating a set of available clouds based on predefined metrics and policy;
   ensuring the user and the workload package are authorized to access the selected cloud;
   processing the workload package by replacing generic hardware and software settings identified in configuration information with the workload package with specific hardware and software settings that are specific to the cloud, the specific hardware and software settings include hardcoded Internet Protocol (IP) addresses, hardcoded Domain Name System (DNS) names, certificates, and specific machine ports; and
   configuring and deploying a workload from the workload package into the cloud for access by the user.

11. The method of claim 10 further comprising, setting expense and usage limitations on the processing of the workload within the cloud based on policy and an identity associated with the user.

12. The method of claim 10 further comprising, de-provisioning the workload from the cloud based on a terminating event.

13. The method of claim 10, wherein connecting further includes receiving a login request from the user via the mobile device, the user and the mobile device authenticated to make a connection with the mobile device.

14. The method of claim 10, wherein resolving further includes receiving Global Positioning Satellite (GPS) coordinates directly from the mobile device to resolve the physical location.

15. The method of claim 10, wherein selecting further includes identifying some of the metrics as values for each of the available clouds representing: expense data for using a particular cloud, processing load, security enforced, and wherein the policy includes threshold values to compare against the values when picking the selected cloud.

16. The method of claim 10, wherein ensuring further includes enforcing identity and policy based restrictions on the user when accessing cloud resources of the cloud in connection with the workload.

17. A system, comprising:
   a workload packager implemented and programmed in a non-transitory computer-readable storage medium and to execute on one or more processors of a first cloud processing environment (first cloud);
   a workload deployment manager implemented and programmed in a non-transitory computer-readable storage medium and to execute on one or more processors of a second cloud;
   the workload packager configured to acquire a workload identifier for a workload having a plurality of workload resources to package the workload as a workload package, the workload packager further configured to remove and make generic specific hardware and software settings that are referenced in the workload resources and that are specific to the first cloud, the workload deployment manager configured to select a target cloud when requested to do so for deploying the workload package as a new instance of the workload by changing the generic specific hardware and software settings to new hardware and software settings that are now specific to the target resources of the target cloud and include hardcoded Internet Protocol (IP) addresses, hardcoded Domain Name System (DNS) names, certificates, and specific machine ports.

18. The system of claim 17, wherein the workload packager and the workload deployment manager are each configured to enforce identity and policy based authentication when creating the workload package and when deploying the new instance of the workload from the workload package.

19. The system of claim 17, wherein the workload deployment manager is configured to de-provision the new instance of the workload from the target cloud based on detection of a terminating event.

* * * * *

UNITED STATES PATENT AND TRADEMARK OFFICE
CERTIFICATE OF CORRECTION

| | |
|---|---|
| PATENT NO. | : 8,566,838 B2 |
| APPLICATION NO. | : 13/046535 |
| DATED | : October 22, 2013 |
| INVENTOR(S) | : Jason Allen Sabin et al. |

It is certified that error appears in the above-identified patent and that said Letters Patent is hereby corrected as shown below:

In the Claims:

In column 11, line 51, in Claim 13, delete "login." and insert --login--, therefor Signed and Sealed this
Twenty-ninth Day of April, 2014

Michelle K. Lee
*Deputy Director of the United States Patent and Trademark Office*